Jan. 29, 1935.  H. H. HOLLOWAY  1,989,450
AIRPLANE CONSTRUCTION
Filed Dec. 9, 1932   3 Sheets-Sheet 1
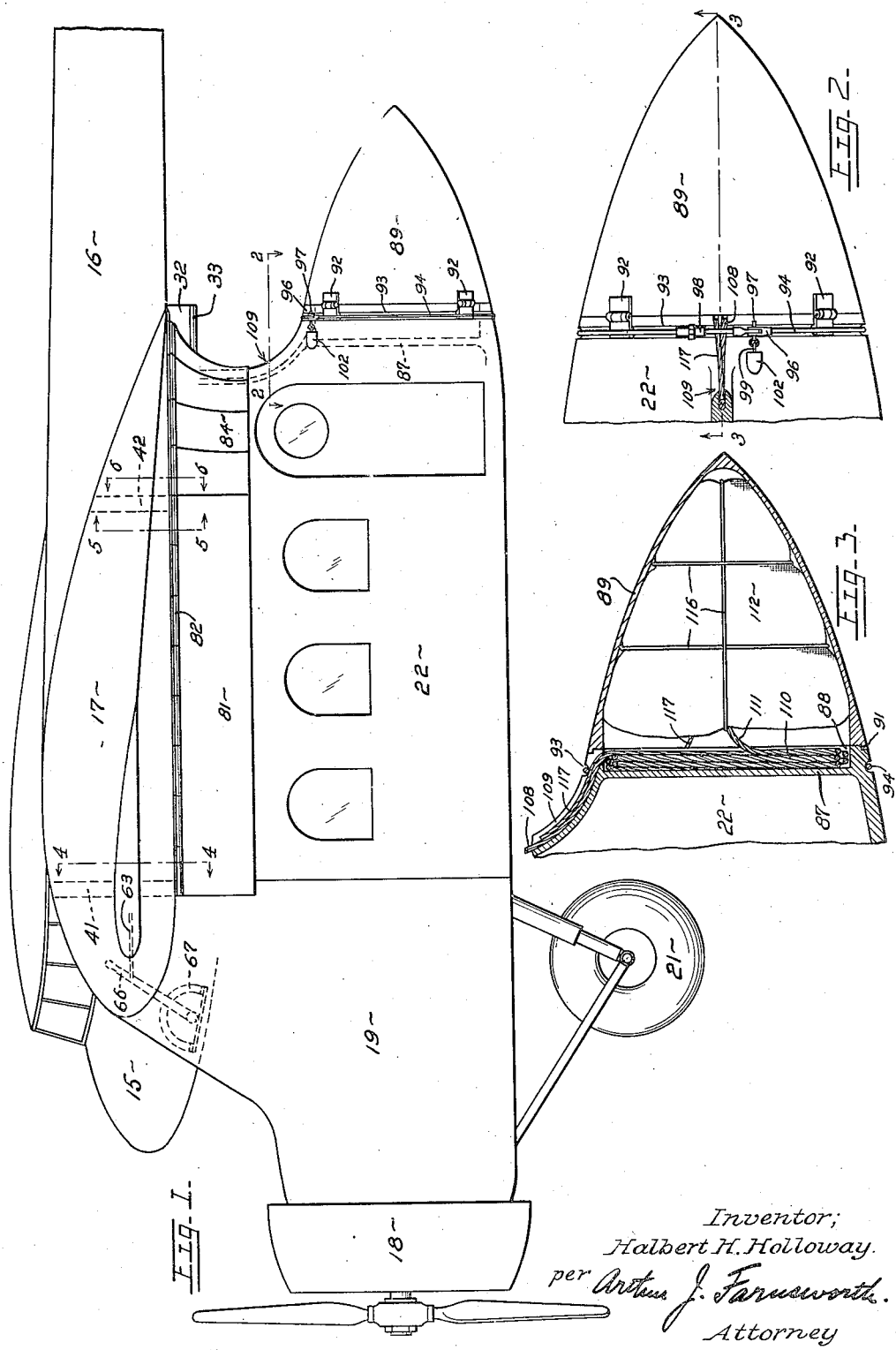

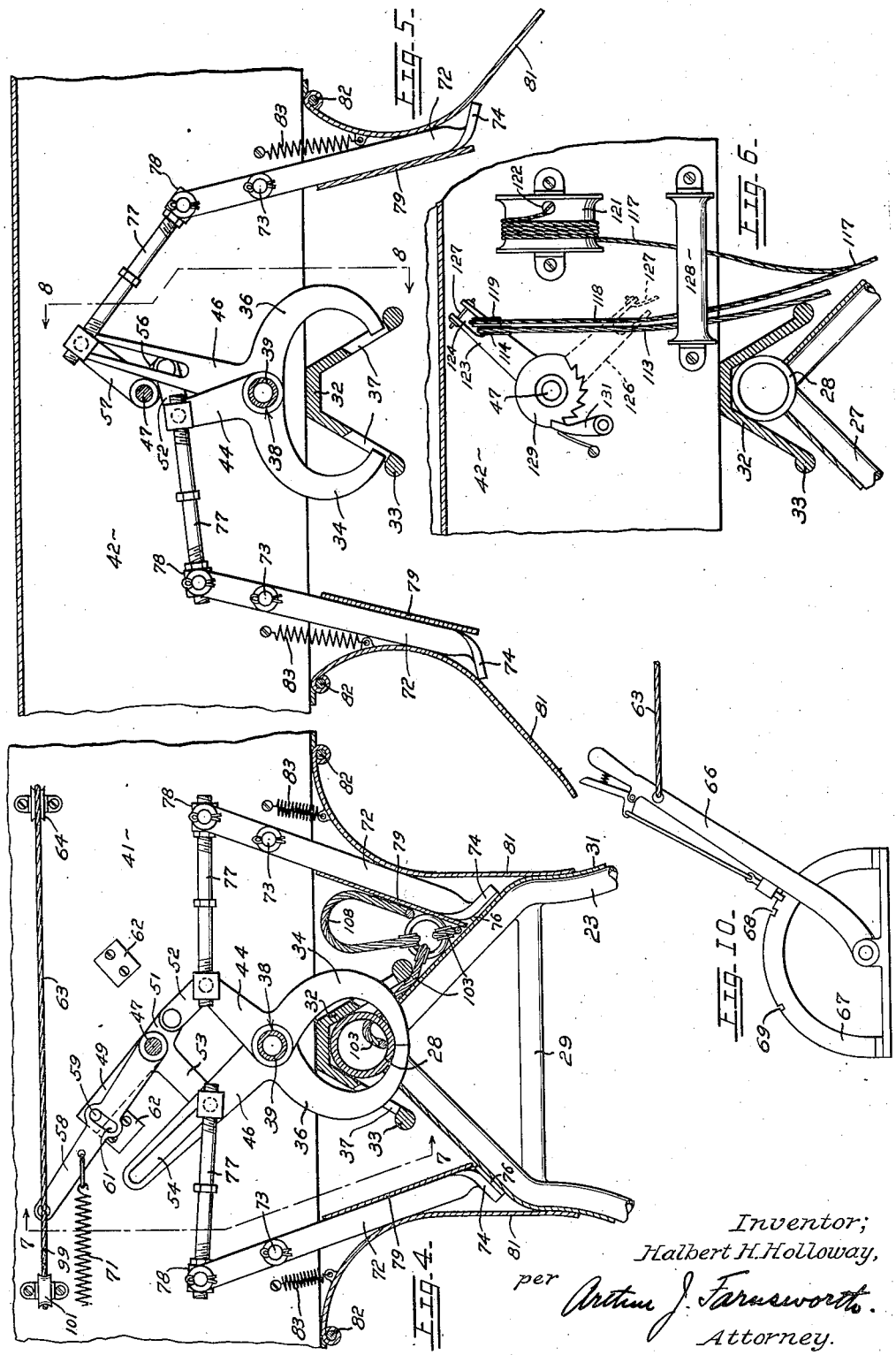

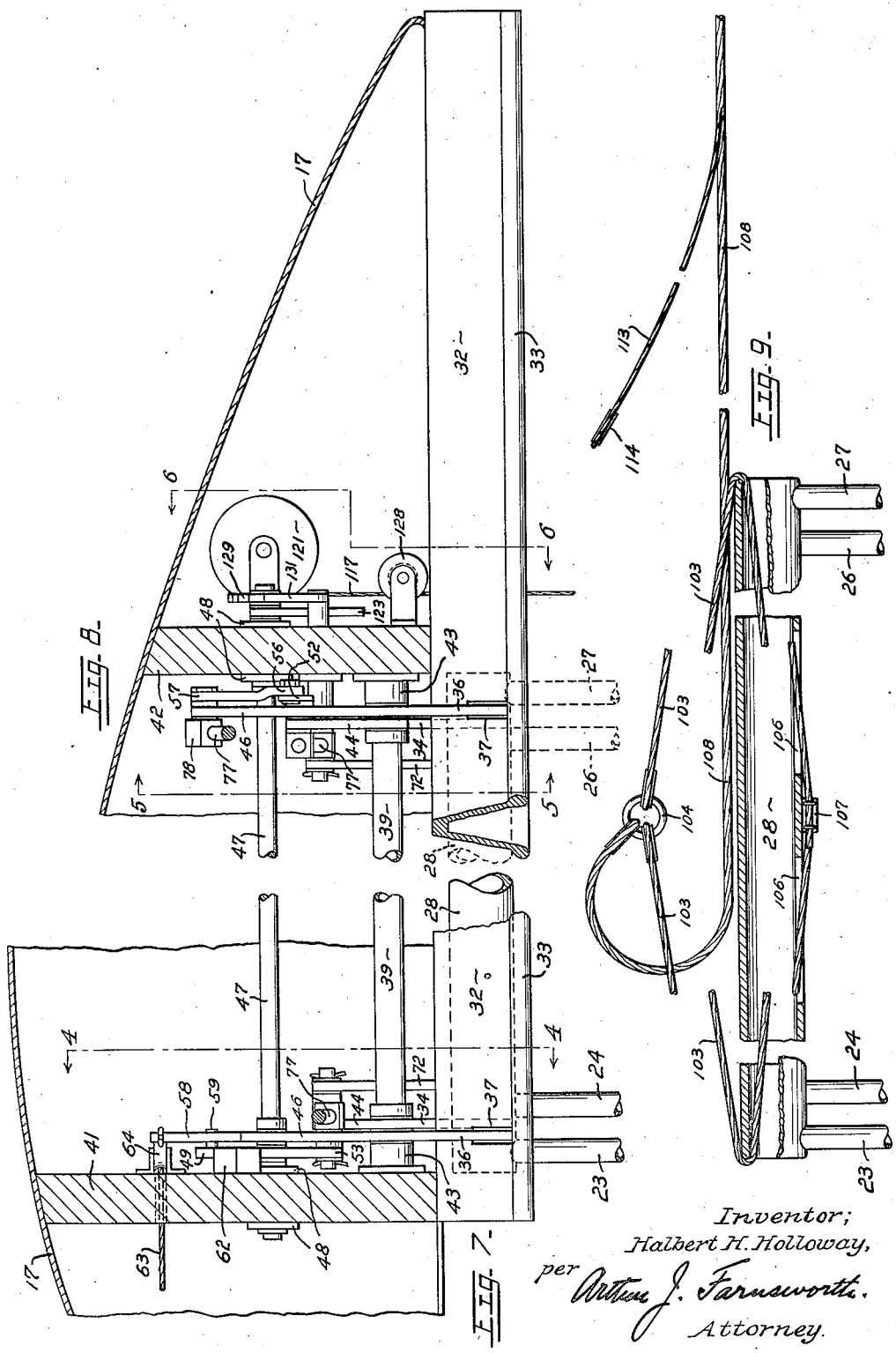

Patented Jan. 29, 1935

1,989,450

UNITED STATES PATENT OFFICE 1,989,450

AIRPLANE CONSTRUCTION

Halbert H. Holloway, Los Angeles, Calif.

Application December 9, 1932, Serial No. 646,366

2 Claims. (Cl. 244—21)

In this specification, and the accompanying drawings I shall describe and show a preferred form of my invention, and specifically mention certain of its more important objects. I do not limit myself to the forms disclosed, since various changes and adaptations may be made therein without departing from the essence of my invention as hereinafter claimed; and objects and advantages, other than those specifically mentioned, are included within its scope.

My invention relates to airplane construction wherein quickly detachable passenger cabins are used for the protection of the occupants, in cases of emergency.

It is well understood that parachute protection in one form or another, is the only comprehensive form of protection that is available to occupants of airplanes in flight; and it is now rather generally conceded that quickly detachable passenger cabins, adapted for parachute suspension, afford the most practical general means of protection known. With the use of detachable passenger cabins, human error is not very likely to enter into the result, so far as disposition of the passengers is concerned. In the use of such facilities there is no problem of exit means for the passengers, and there is no need for individual parachutes with their inconvenience and bad psychological effect. The possibility of injury in landing, and in being dragged by the wind afterward, is largely removed. Still further practical advantages are, the comparative freedom from subjection to electrical shocks from high tension wires, and from drowning in case the landing occurs on water. In view of these and other practical considerations, the most promising method for obtaining parachute protection of passengers, is believed to be had by the use of quickly detachable passenger cabins.

It must be borne in mind that, in order to be as fully protective as possible, such detachable cabins must be capable of being released in a manner that will cause them to very quickly depart from the airplane, no matter what the flying position of the latter at the moment may be.

Detachable passenger cabins for airplanes hitherto have been either of the "pull-off" or "free-fall" types, each type having its limitations and special advantages. So long as the flying speed is relatively low, say around 100 miles per hour, the pull-off arrangement probably is the most satisfactory, and it is particularly useful at low flying altitudes. The speed of airplanes has constantly been increasing however, and a speed of 200 miles per hour in level flight is now not uncommon. A pull-off at such speed would cause such a deceleration shock that the passengers within the released cabin would be subjected to injury from this cause, and the parachute very likely would be badly damaged.

The free-fall arrangement is adapted for use at any flying speed, so long as the flying altitude is sufficient. However a comparatively long fall is necessary to accomplish the full opening of the required large parachute, and this eliminates the usefulness of the free-fall arrangement at low flying altitudes.

For the full protection of the occupants of an airplane during flight, it is believed that the most desirable system thus far suggested, is the use of a detachable passenger cabin that may be instantly released, either as a free-fall or pull-off, in any flying position of the plane, with the least possibility of entanglement, and even in upside-down flying, spins, and steep dives.

In view of the principles that have been outlined in the foregoing discussion, the salient objects of my invention are; first, to provide an improved method for supporting and instantly releasing a passenger cabin of an airplane in flight, when the plane is in any flying position whatsoever; second, to provide a means for releasing said cabin that is selective as to pull-off or free-fall, so that the former may be used at low altitudes and relatively slow speed, and the latter at high altitudes and high speed; third, to provide means for releasing passenger cabins from airplanes without the necessity for using excessively large parachutes, since large parachutes require long shroud lines, a greater fall before fully opening, and they are more susceptible to prolonged oscillation; fourth, to provide an airplane construction which is adapted for detachable passenger cabins, of such type that the cabins will impose no increased aero-dynamic resistance and will add very slight additional weight; fifth, to provide an airplane arrangement having detachable passenger cabins, such that the flying characteristics of the airplane proper will not be seriously affected by the discharge of such cabins; and, sixth, to accomplish the above objects by means of very simple, dependable, and relatively inexpensive construction.

My objects are attained in the manner illustrated in the accompanying drawings, in which—

Figure 1 is a side elevation of the forward portion of an airplane of an improved type, which I have selected for conveniently disclosing my invention;

Figure 2 is a plan view of the after portion of the passenger cabin and parachute container of the above construction; the view being taken on the line 2—2 of Fig. 1, and being drawn slightly larger in scale;

Figure 3 is a central longitudinal section of the construction shown in Fig. 2, in elevation; the view being taken on the line 3—3 of Fig. 2, and drawn to the same scale;

Figure 4 is an elevation of the rear side of a portion of the forward wing spar of the plane, showing the cabin release mechanism and a portion of the cabin structure supported thereby, in sectional elevation; the view being taken on the line 4—4 of Fig. 1, and on a much larger scale;

Figure 5 is an elevation of a portion of the front side of the after wing spar of the plane, showing the cabin supporting mechanism after the cabin has been released, the view being taken on the line 5—5 of Fig. 1, and on the same scale as Fig. 4;

Figure 6 is an elevation of a portion of the rear side of the after wing spar of the plane, showing a portion of the cabin supporting mechanism before the cabin has been released, the view being taken on the line 6—6 of Fig. 1, and drawn to the same scale as Figs. 4 and 5;

Figure 7 is a sectional elevation of the construction shown in Fig. 4, the section being taken on the line 7—7 of the latter figure;

Figure 8 is a sectional elevation of the construction shown in Fig. 5, taken on the line 8—8 of the last mentioned figure;

Figure 9 is a sectional elevation of the upper portion of the frame of the detachable passenger cabin, illustrating the cables whereby it may be suspended from a parachute after being released; and Figure 10 is an elevation of the operating lever by which the detachable passenger cabin may be selectively released, either as a pull-off or a free-fall.

Similar reference numerals refer to similar parts throughout the several views.

It will be understood that my invention is applicable to many types of airplanes; and that, for the purposes of this disclosure, I have merely selected a type of plane to which it appears to be particularly applicable. This plane is illustrated in Fig. 1, and comprises a bi-motor monoplane construction, having a central pilot's cockpit at 15, a fuselage 16 at the rear of the cockpit, and wings 17 of which only one is shown. At either side of the cockpit and fuselage, and spaced therefrom and from each other, are power units 18 with rearwardly extending housings 19 into which a landing gear 21 may be retracted in flight. Immediately at the rear of each housing 19, and completing the streamlining thereof, is a detachable passenger cabin 22 that may be released in flight, in any flying position of the plane. It will thus be seen that the plane that I have selected for illustration has two spaced power units, and two spaced and releasable passenger cabins immediately behind the power unit housings. The cabins thus introduce practically no aero-dynamic resistance; and the passenger load is divided into two halves, either or both cabins being released in flight as occasion may require.

In the application of the present invention it appears to be desirable to build the passenger cabin enclosures around tubular frame-work, the upper ends of the vertical members of the frames, at the respective ends of the cabins, being arranged as slightly spaced pairs, as shown at 23 and 24, and 26 and 27. These are welded to a large horizontal fore-and-aft supporting tube 28. The upper ends of the opposed vertical frame tubes thus necessarily converge, and are cross-braced below supporting tube 28 by means of the welded-on strut tube 29. The outer skin of the cabin is shown at 31.

An inverted channel member 32 is attached to the lower side of the wing structure, and runs fore and aft to slightly beyond the rear edge of the wing, as indicated in Figs. 1 and 8. This channel has outwardly flared sides, and bulbous edges 33 for added strength. The cabin supporting tube 28 is adapted to fit closely within this channel, and to be slidable therealong in case the cabin is released as a pull-off.

The passenger cabin is normally supported by means of two pairs of tongs having heavy hooks 34 and 36 that engage supporting tube 28 near its respective ends, and within channel 32. These hooks may be adapted to completely surround channel 32, or to extend through apertures 37 in the sides thereof, as shown in the drawings. It is preferable to have the spacing between the upper ends of frame uprights 23 and 24, and 26 and 27, such that the ends of the supporting hooks may fit fairly snugly between the upright pairs. This expedient serves as a means for fore-and-aft positioning of the cabin, and for preventing otherwise possible unintentional disengagement between the hooks and the adjacent ends of supporting tube 28. The hooks are arranged so that they may be instantly opened for releasing the cabin, as shown in Fig. 5.

Hooks 34 and 36, assembled as co-operating pairs, are pivotally mounted at 38 upon a horizontal tubular supporting member 39; running fore and aft between wing spars 41 and 42, and supported at its respective extremities by sockets 43 that are affixed to these spars.

Hooks 34 are provided with upwardly and angularly extending integral arms 44. Hooks 36 are similarly provided with longer longitudinally slotted arms 46. These arms, cooperating with suitable mechanism to be described below, serve to control the operation of the hooks, and complete the supporting tongs arrangement mentioned supra.

For operating the supporting tongs, I have shown a rotatable torsion shaft 47, passing horizontally through the forward and after wing spars, and rotatable in bearings 48 attached to the spars. Adjacent the forward spar, and slightly to the rear thereof, is a double bell-crank lever 49, attached to torsion shaft 47 and rotatable thereby. Crank 51 of this lever is pivotally connected to arm 44 of the forward tongs, by means of a short link 52. The other crank 53 engages slot 54 of arm 46, as by means of a pin and rotatable bushing thereon (not shown).

The method for operating the rear supporting tongs shown in Fig. 5, is similar to that just described. Thus, a bell-crank lever that is affixed to torsion shaft 47, and that has a short crank 56, and a long crank 57, is similarly connected to rear tong arms 44 and 46, by the use of a similar link 52.

For operating and controlling the above described cabin supporting and releasing gear, I prefer to employ a floating cross-slotted lever 58. This is freely rotatable upon torsion shaft 47. A pin 59 extends from the side of bell-crank lever 49, near its upper extremity, and engages cross slot 61 in lever 58. This construction permits lever 58 to swing a few degrees without affecting the tong mechanism; but the tong mechanism may be operated by lever 58 if it is swung sufficiently far for that purpose.

Stops 62 limit the motion of double bell-crank lever 49; and they are so positioned that, when the tongs are engaging and supporting the passenger cabin structure, as shown in Fig. 4, link 52 will pass beyond its dead center to form a toggle lock. Also the slot 54 bottoms at a point that enables it to co-act with crank 53 to afford a toggle effect when the tongs are closed. No stops are required to limit the movement at the rear spar, since it is controlled by bell-crank lever 49.

Cross-slotted lever 58 is operated by a wire rope cable 63 leading over suitable pulleys, as 64, to an operating lever 66 in the pilot's cockpit. Pushing this lever forward will exert a pull upon cable 63 and move slotted lever 58 freely clockwise (see Fig. 4) for a short distance, and until the left-hand end of its slot 61 engages pin 59. A further movement of the slotted lever in this direction will then rotate double bell-crank lever 49 clockwise; and, by reason of the mechanism described, both tongs will move to open position, as illustrated in Fig. 5. This instantly releases the passenger cabin.

The operating lever 66, in the pilot's cockpit, is provided with a quadrant 67 having notches therein for holding the lever in a desired position. Thus, as shown in Fig. 10, the operating lever is latched in position for maintaining the tong mechanism in its cabin-holding position. Pushing lever 66 slightly forward, so that its latch engages notch 68 will result in moving lever 58 to the point where the left-hand end of its cross slot will engage pin 59, and no further. This will have no direct effect whatever upon the tong supporting gear, but nevertheless will result in releasing the passenger cabin as a pull-off, in a manner that will be explained below. Pushing lever 66 to its forward limit, so that its latch engages notch 69 in the quadrant, will directly release the passenger cabin as a free-fall. A tension spring 71 is provided, to keep the described mechanism in its normal position; and to maintain cross-slotted lever 58 in the position shown in Fig. 4, until it is desired to release the passenger cabin. Any material displacement of this lever will result in releasing the cabin, as will be explained below.

It will be seen from the foregoing description, that the passenger cabins normally are suspended from horizontal central supporting tubes 28, running fore and aft; and that these tubes in turn are supported, near their respective extremities, by tong mechanisms. Obviously therefore, so far as the preceding description goes, the cabins would be free to swing laterally, and this cannot be permitted. To prevent lateral movement of the cabins, I include a swingable diagonal brace 72 at each side of each cabin, fore and aft, as parts of each of the tong mechanisms. These braces are intermediately pivoted to the wing spars at 73, and have feet 74 adapted to engage pads 76 on converging portions at the upper ends of the cabin structure. These pads may be made of semi-hard rubber, or similar material. The diagonal braces are pivotally connected to the tong mechanisms, so as to be swingable thereby, by means of link-rods 77 of adjustable length. Thus, by screw-threading the opposite ends of these rods right and left handedly, they may readily be adjusted so that braces 72 will be under proper compression when the tong mechanisms are in closed position as shown in Fig. 4. Adequate lateral support for the passenger cabins is afforded in this manner, and they cannot swing laterally so long as the tong mechanisms are in closed position.

A very convenient method of connecting the diagonal braces to the tong mechanisms, is by the use of cubical cast or forged steel connecting blocks 78. These may be tapped for receiving the screw-threaded ends of link rods 77; and they have laterally extending integral pins, serving to form the required pivotal connections.

The lower ends of braces 72 carry fore and aft extending panel boards 79; to form cable-stowing compartments on top of the cabins, immediately below the wing spars.

The stream-lining of the construction, immediately behind power unit housings 19, is carried out and completed by means of swingable flaps 81. These are so shaped as to form fillets at the juncture of the wing and cabin structure, as indicated in Fig. 4, and are hinge-pivoted to the bottom side of the wing structure at 82. These flaps are free to swing laterally outwardly when pushed out by diagonal braces 72, as shown in Fig. 5. They are constrained by tension springs 83 to normally close the gap between the top of the cabin housings and the under surface of the wings.

Inasmuch as the upper portion of the cabin structure tapers to a relatively sharp edge at the rear, a series of similarly hinged and spring constrained flaps 84 are provided at the rear of the construction, to complete the stream-lining. In the case of a pull-off, the cabin, in moving rearwardly, will push these flaps outwardly, without interfering appreciably with the movement of the cabin.

As indicated above, the passenger cabins are wholly enclosed. At the extreme rear of their lower portions, they preferably are circular in cross-section, and are formed to afford a circular cable-stowing compartment immediately behind the after bulkhead 87. This compartment may be divided into two separate semi-circular halves by a vertical partition 88, in order that coils of two different cables may be kept separated in such a manner as to prevent any possibility of their becoming entangled with each other. The stream-lining at the lower portion of the cabins at the rear, is completed by hollow acorn-shaped parachute containers 89, for stowing parachutes of sufficient size to support the cabins and their passengers after the same have been released from the airplane. The containers are arranged to be very quickly detachable from the cabins in flight, by means under control of the pilot, in a manner to be explained.

The parachute containers are fitted to a circular rim at the after end of the cabins, as by means of the circular shoulders indicated at 91. The purpose of this construction is merely to keep the parachute containers centered under normal conditions, and the arrangement must not interfere with the immediate free fall of the containers after being released from the cabins. The containers are normally held in place by means of four specially shaped hinges 92, placed upon diagonals. The forward leaves of these hinges are grooved, and fit into an annular recess 93 at the rear of the cabin housings. Circular metallic hoops 94 normally engage the grooves of the hinged leaves, and the parachute containers are normally maintained in position by this means. The hoops 94 are completed by means of male and female clevice fittings 96, and by draw-pins 97 passing therethrough. The hoops may be adjusted to their proper tension, after being placed, by means of turn-buckles, as at 98.

Fig. 4 shows a previously unmentioned cable 99 leading from the upper end of cross-slotted lever 58, over suitable guide pulleys such as indicated at 101, back through the wing structure and thence downwardly through a metallic pipe or tube (not shown) within the construction of the passenger cabin. The lower end of this tube emerges from the rear end of the cabin, as shown at 102 in Figs. 1 and 2. Immediately at the rear of the tube extremity, cable 99 is attached to draw-pin 97, and the length of the cable is adjusted in such a manner that lever 58 cannot move more than a very few degrees without pulling the draw-pin out of its clevice fittings, and thus releasing hoop 94. The size of the tube is made such that cable 99, and draw-pin 97, can easily be pulled therethrough, care being taken to have the bends in the tube of long radius for this purpose.

For supporting the passenger cabins from their parachutes, after they have been released from the airplane, I provide wire rope bridles, as shown at 103 in Fig. 9. These consist of two lengths of wire rope cable, the upper ends of which are made into loops that engage supporting rings, such as is indicated at 104. The lower ends of the bridles are led into the respective ends of supporting tube 28 and then out through longitudinal slots 106 in the bottom thereof. After emerging from the slots, the cable ends are fastened together by a suitable clamp 107, that is of a size too large to pass through the slots. The slots are spaced from each other and, in this manner, the bridle may be kept centered with respect to supporting tube 28.

The cabin-supporting cable 108, leading to the parachute, has its forward end made into a loop that engages ring 104, and thus is permanently attached to the passenger cabin structure. This cable leads backwardly along the top of the cabin to the rear, in the compartment afforded by panel boards 79, and thence goes downwardly in an open slot at 109, at the extreme after end of the passenger cabin, as indicated in Figs. 2 and 3. From the slot the cable leads to a coil 110 of proper length, within the compartment at the rear of the cabin after bulkhead. Free end 111 of this coil leads into the parachute pack 112, and is attached to a shroud ring therein (not shown). Cable 108 has an intermediate branch 113 spliced thereinto, as shown in Fig. 9, the upper extremity of the branch being formed into a loop at 114.

The term parachute pack, as hitherto used, includes a properly folded parachute within an outer cover; held in place, in accordance with the usual practice, by quickly releasable cords 116. Any suitable cord releasing means may be employed, if it conforms to standard approved practice. For releasing the parachute from its pack, a rip-cord 117 is provided. This leads from the parachute pack into a short coil (not shown) within the cable-stowing compartment at the cabin, and thence upwardly through open slot 109, being disposed on top of supporting cable 108. This rip cord is formed with an intermediate branch 118, with a loop 119 at its extremity. The upper end of the rip-cord proper is led over and coiled around a rotatable spool 121, that is mounted upon rear wing spar 42, as shown in Fig. 6, the extremity of this main part of the rip-cord being attached to the spool at 122.

On the after side of the rear wing spar 42, I have illustrated auxiliary cabin release mechanism in Fig. 6. This mechanism is necessary, and comes into play, only when a cabin is released as a pull-off. It comprises a lever 123 that is affixed to the rear end of torsion shaft 47, and having a longitudinal slot 124 at its extremity. When the cabin is in its normal supported position, the lever extends upwardly as shown in Fig. 6; but it may be pulled downwardly into the position shown by dotted lines 126, for operating the tong mechanism and releasing the cabin. The upper end of branch 113 of the supporting cable, and the upper end of branch 118 of the rip-cord, engage slot 124 by means of their respective loops. These loops may be prevented from escaping from the slot unintentionally, by means of an easily rupturable string 127 placed across the bifurcated extremities of lever 123. Both of these cable branches lead behind a guide roller 128, to insure that they may exert a true downward pull upon lever 123, for a purpose to be described. A ratchet wheel 129, and a pawl 131, are provided, to make it impossible for the tong mechanism to move backwardly after it has once been operated to open.

The operation of my invention will now be described.

Whenever an emergency arises of such character as to make it necessary to discharge either or both passenger cabins from the airplane, the pilot decides, in consideration of altitude, speed, and flying position, whether to effect the release as a pull-off or free-fall. If he decides upon a pull-off, he pushes operating lever 66 forward, so as to engage the first notch 68. This movement serves to pull draw-pin 97, and will release container 89 and its contained parachute pack. The cabin itself will remain supported. Due to the speed of the airplane, and the wind resistance upon the parachute pack, the latter will quickly trail to the rear of the cabin. The length of the rip-cord is made such that it will not operate until the packed parachute is beyond the tail of the airplane. At this point the drag of the parachute pack will produce a tension in the rip-cord which will be resisted by the engagement of its branch 118 with lever 123. This tension will not be sufficient to shift lever 123 however, because of the constraint of spring 71 shown in Fig. 4; but it will result in releasing cords 116 of the pack, and thus permit the parachute to open. As soon as the parachute opens, it will exert a heavy pull upon supporting cable 108; and branch 113 of this cable will then pull lever 123 downwardly to the dotted position 126 shown in Fig. 6, to release the passenger cabin. The cabin will then slide to the rear by reason of the pull of the parachute, being guided by channel 32, at least to some extent, before it clears the airplane. The channel serves to protect the flying structure from damage due to this rearward movement of the cabin.

Should the pilot decide to release the cabin as a free-fall, he pushes operating lever 66 all the way forward, so as to engage notch 69. This will immediately release the cabin as a whole, and, at the same time, draw the pin 97 holding the parachute container. This operation of the supporting mechanism will put lever 123 immediately into its dotted position shown at 126. String 127 will be broken at once, since it is made very easily rupturable and incapable of supporting the weight of cable 108 and rip-cord 117, and their branches 113 and 118 will immediately slide out of their engagements with slot 124. The cabin then will drop freely; and the parachute container also will immediately drop off, releasing the packed parachute. The parachute pack will not open under these circumstances, until rip-cord 117 has wound off of spool 121, and extends from its attachment 122. The parachute cover then will be released and come off, and the parachute will open. The extra available length of the rip-cord coiled upon spool 121 will thus delay the opening of the parachute for a longer interval, after release of the cabin, than when the cabin is released as a pull-off. This insures that the cabin and its parachute will fall sufficiently far to clear the plane, before the parachute opens. During the time of this initial fall, the horizontal velocity of the cabin will be materially dissipated, thus preventing excessive shock upon the parachute rigging, and upon the occupants of the cabin.

It is to be noted especially that either of the releasing operations, just described, may be executed while the plane is in any flying position. Even in upside-down flying, the results of operating the release mechanism will be the same. Thus, in upside-down flying, which certainly is the most adverse condition for the operation of my invention that can be contemplated, the cabin will quickly leave the plane after it is released. This inevitably will occur by reason of its high center of gravity, and the fact that it rides upon the inverted plane supported only along its median line. Aided by wind resistance and gravity, it is thus bound to topple off the plane at once, after its supporting mechanism has been operated in either of the two ways described supra.

It is to be noted further that the illustrations, and the foregoing description of my invention, are merely for disclosure purposes. The drawings may, in fact, be considered to be more or less diagrammatic, no particular effort having been made to show the parts in proper proportionate size, since to do this, on the necessarily very small scale that is permissible herein, would make the drawings less easily understandable.

Finally it will be obvious that many details of the construction may be varied, and expedients, other than those described and shown, may be adopted, without departing from the essence of my invention.

I claim:

1. An airplane comprising; a detachable passenger cabin; a parachute attached to the cabin, and adapted to sustain the cabin with its complement of passengers; and means for quickly releasing the cabin and parachute from the airplane in flight, in any flying position; said releasing means being selective as to causing a free-fall of the cabin, or a pull-off thereof rearwardly by the action of the parachute; the airplane being provided with a horizontal inverted channel extending fore and aft thereof; the cabin structure being provided with an upper supporting member in its median plane, said member being normally within said channel and adapted to slide therealong; and the cabin being normally supported and positioned by tong mechanism engaging said supporting member at two points only, adjacent the respective extremities of the supporting member.

2. An airplane comprising; a detachable passenger cabin; a parachute attached to the cabin, and adapted to sustain the cabin with its complement of passengers; and means for quickly releasing the cabin and parachute from the airplane in flight, in any flying position; said releasing means being selective as to causing a free-fall of the cabin, or a pull-off thereof rearwardly by the action of the parachute; the airplane being provided with a horizontal inverted channel extending fore and aft thereof, and having no permanently attached structure directly below the channel; the cabin structure being provided with an upper supporting member in its median plane, said member being normally fitted within said channel and adapted to slide therealong; and the cabin being normally supported and positioned by tong mechanism engaging said member within said channel at two points only, adjacent the respective extremities of the supporting member.

HALBERT H. HOLLOWAY.